US012601434B2

(12) United States Patent
Sausen et al.

(10) Patent No.: US 12,601,434 B2
(45) Date of Patent: Apr. 14, 2026

(54) FLUID CONNECTION ASSEMBLY

(71) Applicant: Oetiker NY, Inc., Lancaster, NY (US)

(72) Inventors: Kari Ann Sausen, Clarence, NY (US);
Kristian James Hagen, Gasport, NY
(US); Robert John Kern,
Williamsville, NY (US)

(73) Assignee: Oetiker NY, Inc., Lancaster, NY (US)

( * ) Notice: Subject to any disclaimer, the term of this
patent is extended or adjusted under 35
U.S.C. 154(b) by 0 days.

(21) Appl. No.: 18/904,159

(22) Filed: Oct. 2, 2024

(65) Prior Publication Data

US 2025/0122962 A1      Apr. 17, 2025

Related U.S. Application Data

(60) Provisional application No. 63/589,971, filed on Oct.
12, 2023.

(51) Int. Cl.
*F16L 37/12*          (2006.01)
(52) U.S. Cl.
CPC .................................. *F16L 37/12* (2013.01)
(58) Field of Classification Search
CPC ... F16L 37/12; F16L 37/1205; F16L 37/1235;
F16L 33/03; F16L 33/02; F16L 33/025;
F16L 33/10; F16L 33/23; F16L 33/32;
F16L 33/24; F16L 3/1091; F16L 21/06;
F16L 23/04; Y10T 24/14; Y10T
24/44034; Y10T 24/1418
See application file for complete search history.

(56) References Cited

U.S. PATENT DOCUMENTS

| | | | |
|---|---|---|---|
| 4,326,737 A * | 4/1982 | Lehmann ................ | F16L 23/04 |
| | | | 285/365 |
| 5,058,931 A | 10/1991 | Bowsher | |
| 6,908,123 B2 | 6/2005 | Le | |
| 6,913,294 B2 | 7/2005 | Treverton et al. | |
| 8,888,398 B2 | 11/2014 | Werth | |
| 8,936,207 B2 * | 1/2015 | Swan ...................... | B05B 15/40 |
| | | | 239/589 |
| 11,359,751 B2 | 6/2022 | White et al. | |
| 11,480,279 B2 | 10/2022 | Aue et al. | |
| 11,644,138 B2 | 5/2023 | Sillitoe et al. | |
| 11,759,617 B2 * | 9/2023 | Stankowski .......... | A61M 39/12 |
| | | | 285/18 |
| 2008/0221469 A1 | 9/2008 | Shevchuk | |
| 2019/0128456 A1 * | 5/2019 | Aue ........................ | F16L 47/14 |

FOREIGN PATENT DOCUMENTS

| EP | 3361134 A1 | 4/2020 |
|---|---|---|
| FR | 2895057 A1 | 6/2007 |

* cited by examiner

*Primary Examiner* — Aaron M Dunwoody
(74) *Attorney, Agent, or Firm* — Harter Secrest & Emery
LLP; Michael Nicholas Vranjes

(57)          ABSTRACT

A retainer including a first section including a first male
connector and a first female connector, a second section
completely removable from the first section, the second
section including a second male connector and a second
female connector, a first end, a second end, a radially inward
facing surface including a radially inward extending rib, and
a radially outward facing surface, wherein the first male
connector is arranged to engage the second female connector
and the second male connector is arranged to engage the first
female connector to lock the first section to the second
section.

20 Claims, 6 Drawing Sheets

FLUID CONNECTION ASSEMBLY

This application claims the benefit under 35 U.S.C. § 119 (e) of U.S. Provisional Application No. 63/589,971, filed Oct. 12, 2023, which application is incorporated herein by reference in its entirety.

FIELD

The present disclosure relates to fluid connectors, and more particularly, to a fluid connection assembly including a retainer that decreases the insertion force required for assembly and allows for quick assembly and serviceability without the need for tools.

BACKGROUND

Fluid connectors, fluid connections, and fluid connection assemblies are integral components for many applications, for example in residential and commercial appliance applications. Household appliances such as refrigerators, dishwashers, washing machines, and coffee makers require not only the supply of water, but also that water be able to travel between components therein. An example of water traveling between components is water traveling from the inlet to the heater and then to the brew basket. Fluid predominantly moves between components via flexible or rigid hoses which connect to each component by fluid connectors. Such fluid connectors typically include a plastic tube including a barb and a hose clamp that clamps a hose to the barbed tube.

However, there are many drawbacks with current designs. Current fluid connection designs are difficult to secure due to the small confines of the interior of an appliance and the requirement of tools. Additionally, the barbed tubes are susceptible to failure due to their size and brittle material, as well as the distribution of radial force of current hose clamp designs.

SUMMARY

The present disclosure is directed to one or more exemplary embodiments of a retainer for a fluid connection assembly.

In an exemplary embodiment, the retainer comprises a first section including a first male connector and a first female connector, a second section completely removable from the first section, the second section comprising a second male connector and a second female connector, a first end, a second end, a radially inward facing surface including a radially inward extending rib, and a radially outward facing surface, wherein the first male connector is arranged to engage the second female connector and the second male connector is arranged to engage the first female connector to lock the first section to the second section.

In an exemplary embodiment, at least one of the first male connector and the second male connector comprises a recess extending radially inward from the radially outward facing surface, and a projection extending radially outward from the recess. In an exemplary embodiment, the recess is arranged axially between and spaced apart from the first end and the second end. In an exemplary embodiment, the recess forms a first axial surface and a second axial surface. In an exemplary embodiment, the projection is arranged axially between and spaced apart from the first axial surface and the second axial surface.

In an exemplary embodiment, the recess increases in width in a first circumferential direction. In an exemplary embodiment, the projection comprises a tapered surface that extends radially outward in a second circumferential direction, opposite the first circumferential direction. In an exemplary embodiment, the at least one rib comprises a first axial surface extending radially inward from the radially inward facing surface, a second axial surface extending radially inward from the radially inward facing surface, and a convex surface connecting the first axial surface with the second axis surface.

In an exemplary embodiment, at least one of the first female connector and the second female connector comprises a circumferential end, and a tab extending in a circumferential direction from the circumferential end, the tab including a through-hole. In an exemplary embodiment, the axial distance between the first end and the second end is greater than the width of the tab.

In an exemplary embodiment, at least one of the first male connector and the second male connector comprises a first circumferential end, and a first tab extending in a first circumferential direction from the first circumferential end, wherein the first tab includes a radially outward extending projection. In an exemplary embodiment, the axial distance between the first end and the second end is greater than the width of the first tab. In an exemplary embodiment, the at least one of the first male connector and the second male connector further comprises a first protrusion extending in the first circumferential direction from the first circumferential end, wherein a radial space is formed between the first tab and the first protrusion. In an exemplary embodiment, at least one of the first female connector and the second female connector comprises a second protrusion operatively arranged to engage the radial space.

In an exemplary embodiment, at least one of the first female connector and the second female connector comprises a second circumferential end, and a second tab extending radially outward from the second circumferential end, wherein the second tab includes a through-hole. In an exemplary embodiment, the at least one of the first female connector and the second female connector further comprises a radially inward extending recess axially aligned with the through-hole.

In an exemplary embodiment, the at least one rib is arranged axially between and spaced apart from the first end and the second end. In an exemplary embodiment, the at least one rib comprises a first rib aligned with the first end, and a second rib aligned with the second end, the second rib axially spaced apart from the first rib.

In an exemplary embodiment, at least one of the first male connector and the second male connector comprises a recess extending from the second end partially toward the first end in an axial direction, the recess forming a first plurality of teeth, a first circumferential end, and a protrusion extending from the first circumferential end in a first circumferential direction. In an exemplary embodiment, at least one of the first female connector and the second female connector comprises a second circumferential end, a tab extending from the second circumferential end in a second circumferential direction, opposite the first circumferential direction, the tab forming a second plurality of teeth engageable with the first plurality of teeth, and a radial space arranged between the tab and the radially inward facing surface, wherein the protrusion is operatively arranged to engage the radial space.

These and other objects, features, and advantages of the present disclosure will become readily apparent upon a review of the following detailed description of the disclosure, in view of the drawings and appended claims.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

Figure 1:
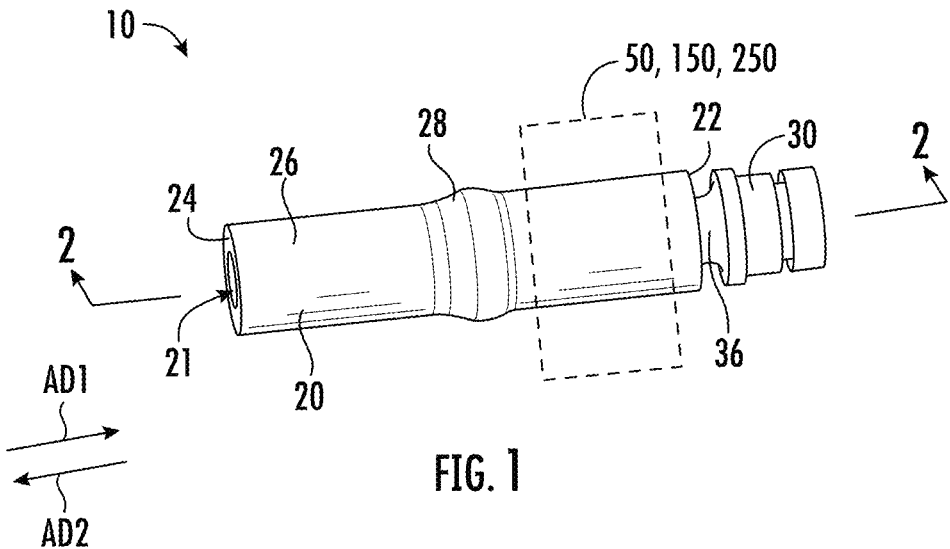
FIG. 1 is a perspective view of a fluid connection assembly.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

Where used herein, the terms "first," "second," and so on, do not necessarily denote any ordinal, sequential, or priority relation, but are simply used to more clearly distinguish one element or set of elements from another, unless specified otherwise.

Where used herein, the term "about" when applied to a value is intended to mean within the tolerance range of the equipment used to produce the value, or, in some examples, is intended to mean plus or minus 10%, or plus or minus 5%, or plus or minus 1%, unless otherwise expressly specified.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "substantially" is intended to mean values within ten percent of the specified value.

Where used herein, the term "exemplary" is intended to mean "an example of," "serving as an example," or "illustrative," and does not denote any preference or requirement with respect to a disclosed aspect or embodiment.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 2:
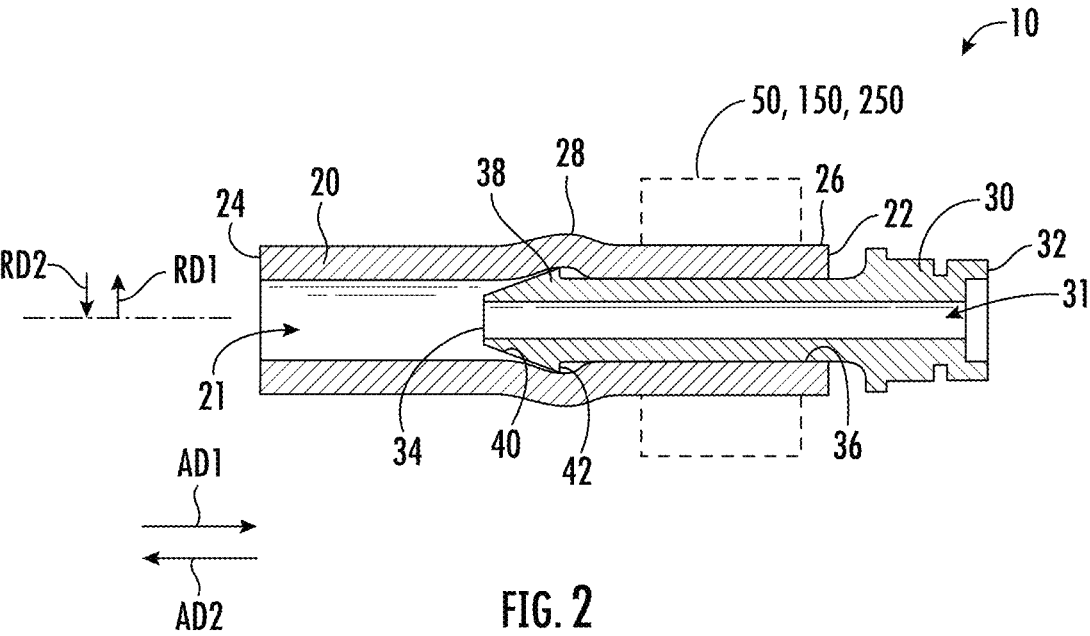
FIG. 2 is a cross-sectional view of the fluid connection assembly taken generally along line 2-2 in FIG. 1.

Adverting now to the figures, FIG. 1 is a perspective view of fluid connection assembly 10. FIG. 2 is a cross-sectional view of fluid connection assembly 10 taken generally along line 2-2 in FIG. 1. Fluid connection assembly 10 generally comprises tube 20, tube or connector body 30, and retainer 50, 150, 250.

Tube 20 comprises end 22, end 24, radially outward facing surface 26, and through-bore 21. Through-bore 21 extends through tube 20 from end 22 to end 24. Tube 20 is operatively arranged to be fluidly connected to tube 30 by retainer 50, 150, 250. Radially outward facing surface 26 includes a substantially constant diameter. In an exemplary embodiment, tube 20 is a flexible conduit operatively arranged to engage tube 30. In such exemplary embodiment, the barb of tube 30 creates bulge 28 when arranged in through-bore 21. Specifically, tube 20 is arranged to be slid onto tube 30 in axial direction AD1 such that end 22 is aligned with radially outward facing surface 36 (see FIG. 2). Retainer 50, 150, 250 can be arranged around radially outward facing surface 26 to secure tube 20 to tube 30, as will be described in greater detail below.

Tube 30 comprises end 32, end 34, at least one radially outward facing surface, for example radially outward facing surface 36, through-bore 31, and barb 38. Through-bore 31 extends through tube 30 from end 32 to end 34. Radially outward facing surface 36 is arranged axially between end 32 and barb 38. In an exemplary embodiment, radially outward facing surface 36 comprises a constant diameter. In an exemplary embodiment, radially outward facing surface 36 comprises a variable diameter. Barb 38 is arranged at end 34 and comprises radially outward facing surface 40 and surface 42. Radially outward facing surface 40 extends from end 36 to radially outward facing surface 36. In an exemplary embodiment, and as shown, radially outward facing surface 40 is a frusto-conical surface increasing in diameter in axial direction AD1. Radially outward facing surface 40 is connected to radially outward facing surface 36 via surface 42. In an exemplary embodiment, surface 42 is a substantially axial surface facing in axial direction AD1.

Figure 3A:
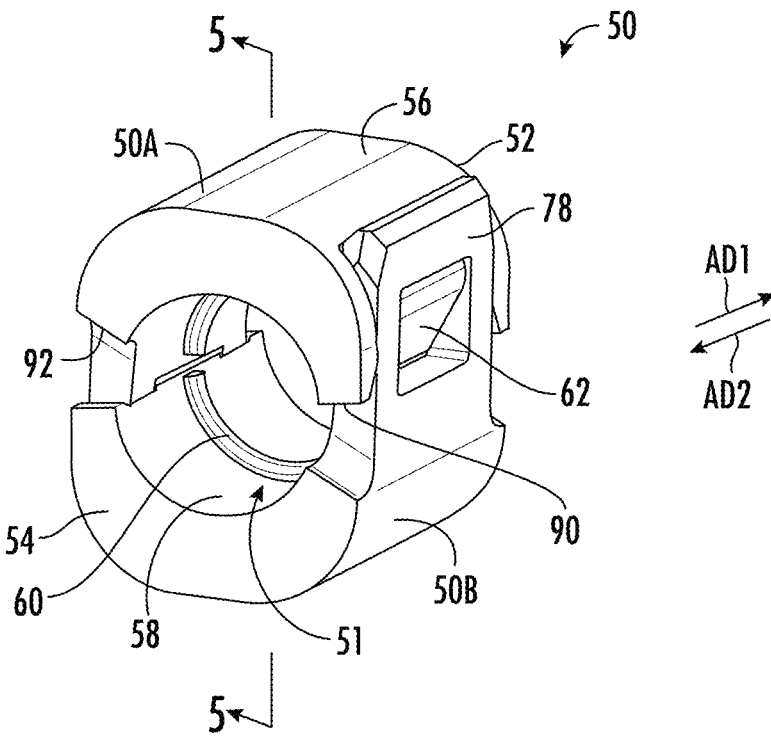
FIG. 3A is a front perspective view of the first embodiment of the retainer shown in FIG. 1.
Figure 3B:
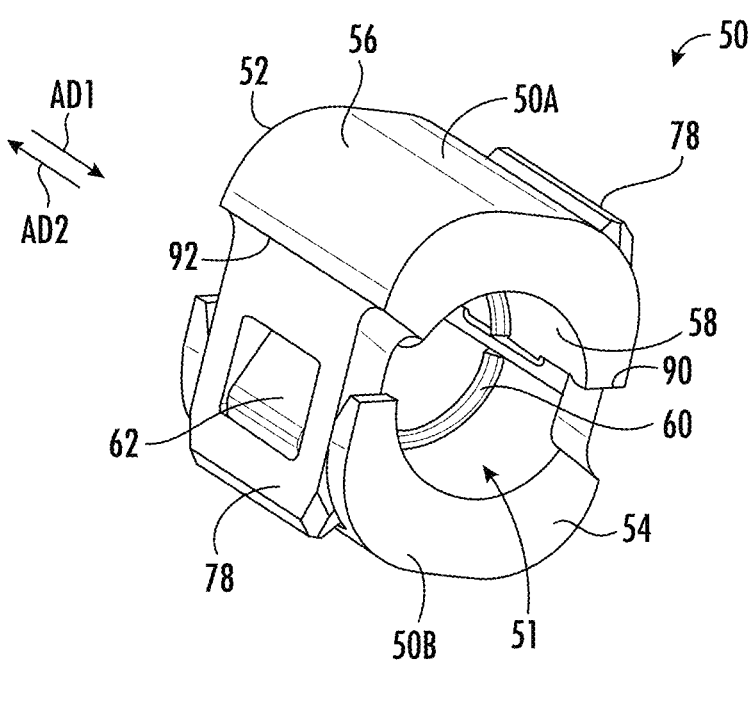
FIG. 3B is a rear perspective view of the retainer shown in FIG. 3A.
Figure 4:
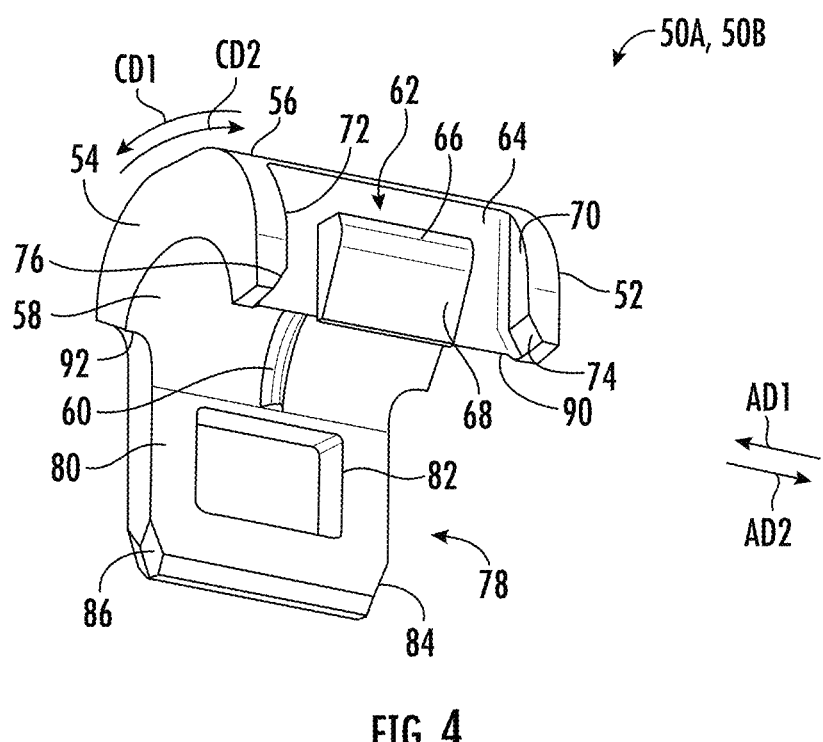
FIG. 4 is a perspective view of the section of the retainer shown in FIG. 3A.
Figure 5:
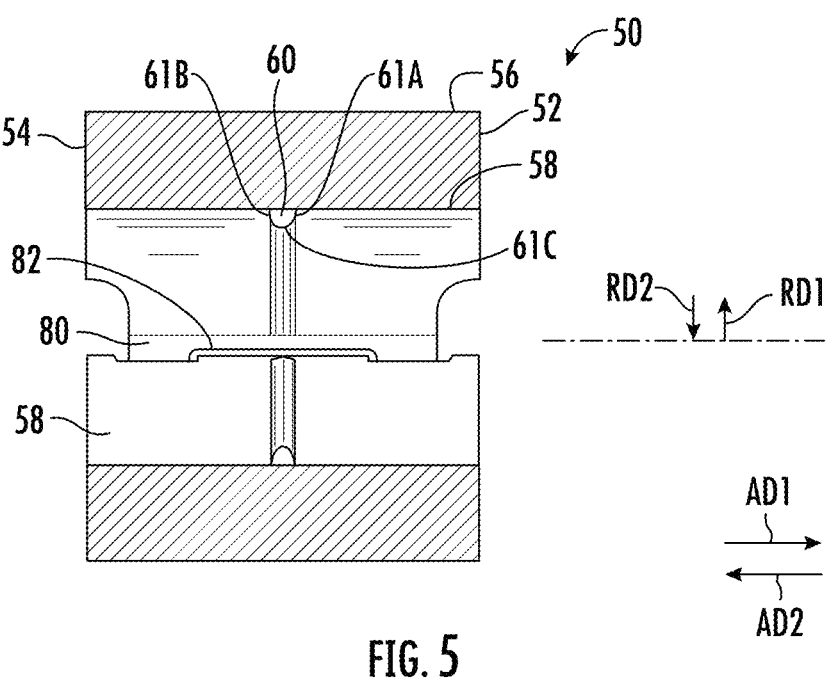
FIG. 5 is a cross-sectional view of the retainer taken generally along line 5-5 in FIG. 3A.

FIG. 3A is a front perspective view of retainer 50. FIG. 3B is a rear perspective view of retainer 50. FIG. 4 is a perspective view of section 50A, 50B of retainer 50. FIG. 5 is a cross-sectional view of retainer 50 taken generally along line 5-5 in FIG. 3A. Retainer 50 comprises end 52, end 54, radially outward facing surface 56, radially inward facing surface 58, and through-bore 51. Through-bore 51 extends through retainer 50 from end 52 to end 54. Retainer 50 is operatively arranged to secure tube 20 to tube 30.

Radially inward facing surface 58 comprises rib 60 arranged axially between and spaced apart from end 52 and end 54. In an exemplary embodiment, and as best shown in FIG. 5, rib 60 comprises a first surface extending radially inward from radially inward facing surface 58 and facing in axial direction AD1, a second surface extending radially inward from radially inward facing surface 58 and facing in axial direction AD2, and a third curvilinear convex surface connecting the first surface and the second surface. In an exemplary embodiment, rib 60 extends completely from circumferential end 90 to circumferential end 92 in circumferential direction CD2. In an exemplary embodiment, rib 60 extends partially from circumferential end 90 to circumferential end 92 in circumferential direction CD2.

Retainer 50 comprises section 50A and section 50B operatively arranged to be secured together to squeeze tube 20 around tube 30, forming a sealing connection therebetween. Section 50A is completely removable from section 50B. Section 50A is substantially identical to section 50B. Section 50A, 50B comprises male connector 62 and female connector 78. Section 50A, 50B comprises circumferential end 90 and circumferential end 92. In an exemplary embodiment, circumferential end 90 extends radially between radially outward facing surface 56 and radially inward facing surface 58. In an exemplary embodiment, circumferential end 90 extends axially between end 52 and end 54. In an exemplary embodiment, circumferential end 92 extends radially between radially outward facing surface 56 and radially inward facing surface 58. In an exemplary embodiment, circumferential end 92 extends axially between end 52 and end 54.

Male connector 62 comprises projection 66. In an exemplary embodiment, male connector 62 further comprises recess 64 that extends radially inward from radially outward facing surface 56. Projection 66 extends radially outward from recess 64 and/or radially outward facing surface 56. In an exemplary embodiment, recess 64 is arranged axially between and spaced apart from end 52 and end 54 and forms surface 70 and surface 72. In an exemplary embodiment, male connector 62 may further comprise tapered surfaces 74 and 76. Surface 74 extends from surface 70 in circumferential direction CD1 in axial direction AD2 and surface 76 extends from surface 72 in circumferential direction CD1 in axial direction AD1. Surfaces 74 and 76 thus increase the width of recess 64 at circumferential end 90. In an exemplary embodiment, projection 66 is arranged at and/or aligned with circumferential end 90. Projection 66 comprises tapered surface 68 which extends radially outward in circumferential direction CD2.

Female connector 78 comprises tab 80 and hole 82 extending radially through tab 80. In an exemplary embodiment, tab 80 extends from circumferential end 92 in circumferential direction CD2. Female connector 78 of one of sections 50A and 50B is arranged to engage male connector 62 of the other of sections 50A and 50B to lock section 50B to section 50A. Specifically, projection 66 of section 50A is arranged to engage hole 82 of section 50B and projection 66 of section 50B is arranged to engage hole 82 of section 50A to lock section 50A to section 50B. In an exemplary embodiment, tab 80 is arranged axially between and spaced apart from end 52 and end 54. In an exemplary embodiment, the axial distance between end 52 and end 54 is greater than the width of tab 80. In an exemplary embodiment, the width of tab 80 is less than the axial distance between surface 70 and surface 72. In an exemplary embodiment, tab 80 comprises tapered surfaces 84 and 86 which decrease the width of tab 80 near a distal end thereof. In an exemplary embodiment, projection 68 extends radially outward at least partially through hole 82. In an exemplary embodiment, projection 68 extends radially inward at least partially through hole 82.

To assemble fluid connection assembly 10, tube 20 is slid onto tube 30 such that end 22 is arranged axially between barb 40 and end 32. Retainer 50 is arranged radially around tube 20 and tube 30 with sections 50A and 50B unlocked and/or separated. Section 50A is displaced radially toward section 50B until tabs 80 engage projections 66 and specifically tapered surfaces 68. Tabs 80 displace radially outward as they slide along tapered surfaces 68 until projections 66 are aligned with holes 82, at which point tabs 80 snap back to their original position such that projections 66 extend at least partially through holes 82 to lock section 50A to section 50B. Retainer 50 squeezes tube 20 around tube 30.

Specifically, rib 60 provides an acute radial force on tube 20 to facilitate a sealing connection between tube 20 and tube 30.

Figure 6A:
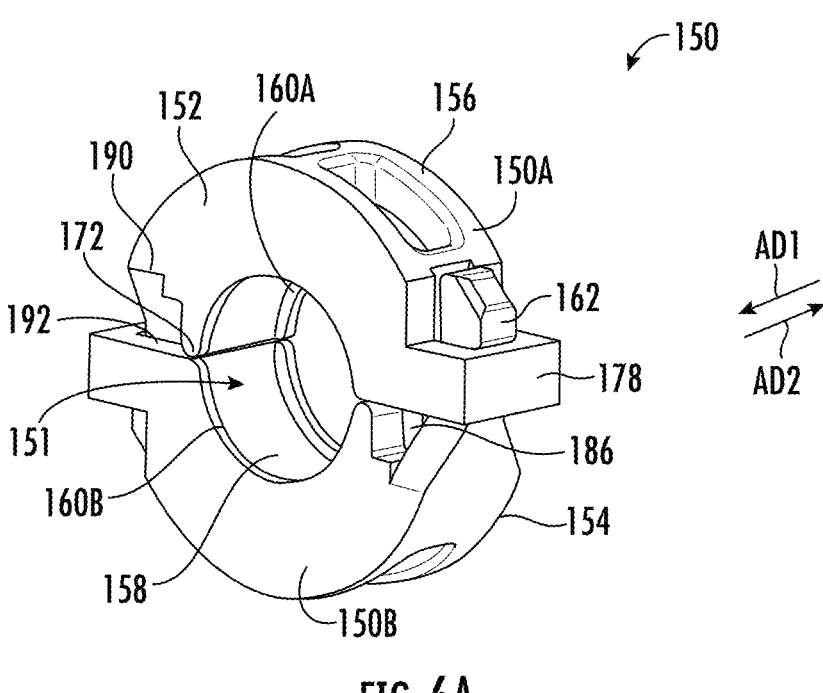
FIG. 6A is a perspective view of the second embodiment of the retainer shown in FIG. 1.
Figure 6B:
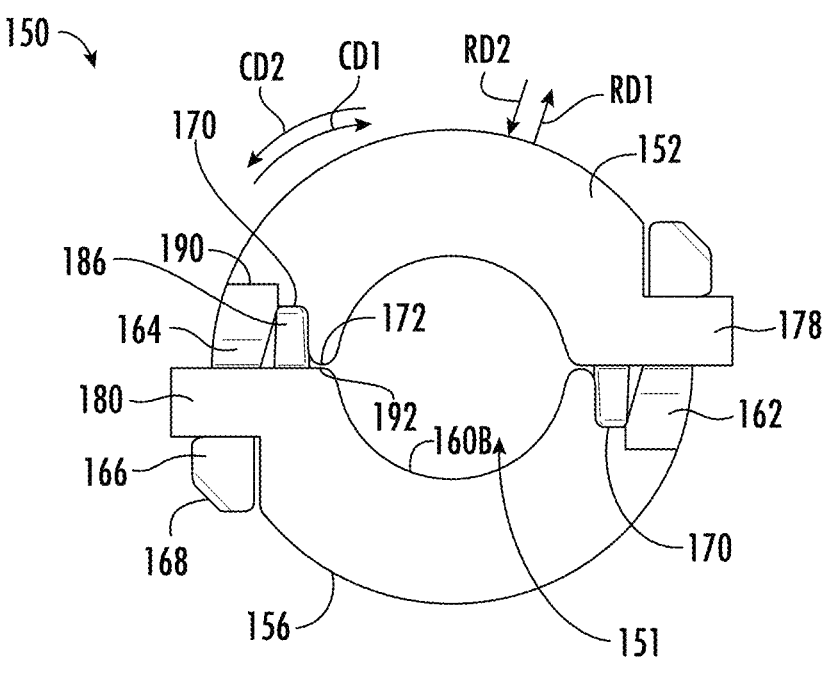
FIG. 6B is a side elevational view of the retainer shown in FIG. 6A.
Figure 7A:
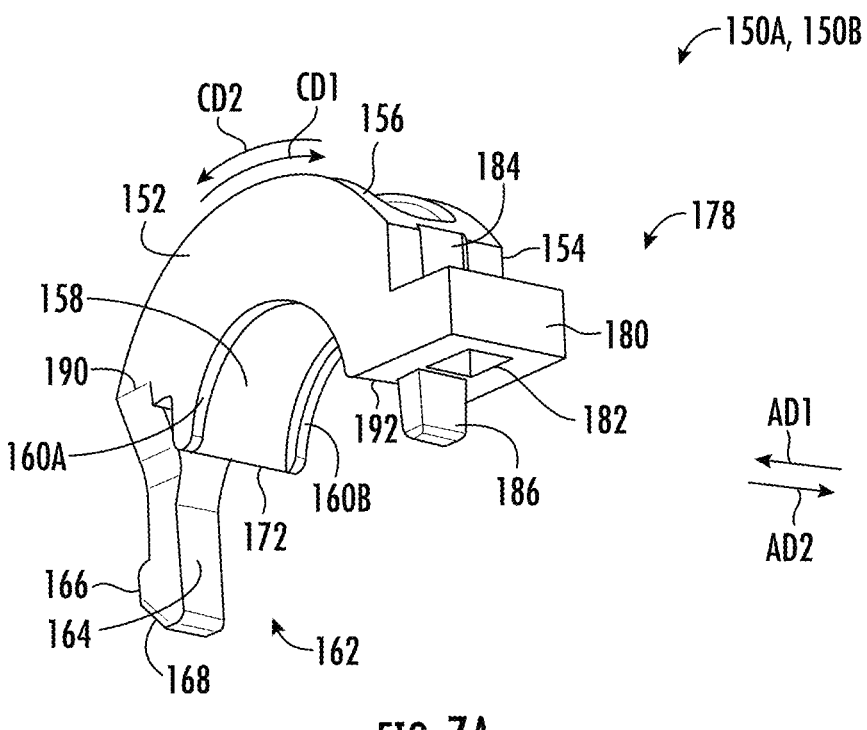
FIG. 7A is a front perspective view of the section of the retainer shown in FIG. 6A.
Figure 7B:
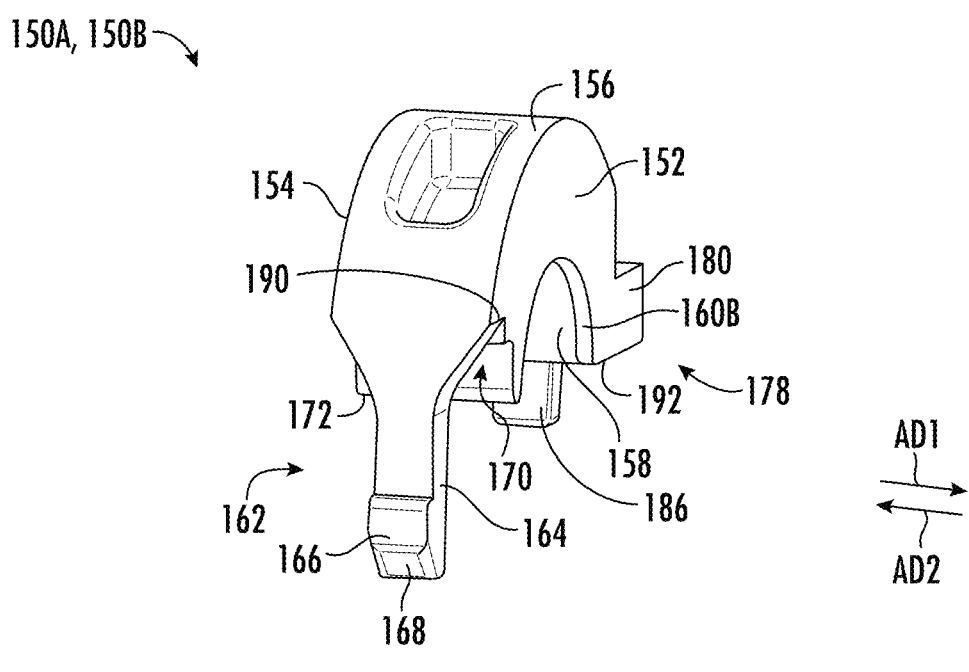
FIG. 7B is a rear perspective view of the section of the retainer shown in FIG. 7A.

FIG. 6A is a perspective view of retainer 150. FIG. 6B is a side elevational view of retainer 150. FIG. 7A is a front perspective view of section 150A, 150B of retainer 150. FIG. 7B is a rear perspective view of section 150A, 150B of retainer 150. Retainer 150 comprises end 152, end 154, radially outward facing surface 156, radially inward facing surface 158, and through-bore 151. Through-bore 151 extends through retainer 150 from end 152 to end 154. Retainer 150 is operatively arranged to secure tube 20 to tube 30.

Radially inward facing surface 158 comprises at least one rib or flange, for example, ribs 160A and 160B. In an exemplary embodiment, rib 160A is arranged at and/or is aligned with end 154 and extends radially inward from radially inward facing surface 158. In an exemplary embodiment, rib 160B is arranged at and/or is aligned with end 152 and extends radially inward from radially inward facing surface 158. In an exemplary embodiment, rib 160A and/or rib 160B extends completely from circumferential end 190 to circumferential end 192 in circumferential direction CD1. In an exemplary embodiment, rib 160A and/or rib 160B extends partially from circumferential end 190 to circumferential end 192 in circumferential direction CD1.

Retainer 150 comprises section 150A and section 150B operatively arranged to be secured together to squeeze tube 20 around tube 30, forming a sealing connection therebetween. Section 150A is completely removable from section 150B. Section 150A is substantially identical to section 150B. Section 150A, 150B comprises male connector 162 and female connector 178. Section 150A, 150B comprises circumferential end 190 and circumferential end 192. In an exemplary embodiment, circumferential end 190 extends radially outward from radially inward facing surface 158. In an exemplary embodiment, circumferential end 190 extends axially between end 152 and end 154. In an exemplary embodiment, circumferential end 192 extends radially between radially outward facing surface 156 and radially inward facing surface 158. In an exemplary embodiment, circumferential end 192 extends axially between end 152 and end 154.

Male connector 162 comprises tab or arm 164 and projection 166. Tab 164 extends from circumferential end 190 in circumferential direction CD2. Projection 166 protrudes radially outward from tab 164. In an exemplary embodiment, the axial distance between end 152 and end 154 is greater than the width of tab 164. In an exemplary embodiment, projection 166 comprises tapered surface 168 which extends radially inward in circumferential direction CD2. Male connector 162 may further comprise protrusion 172 extending from circumferential end 190 in circumferential direction CD2. Groove or radial space 170 is formed between tab 164 and protrusion 172 and is arranged to engage protrusion 186 as will be described in greater detail below.

Female connector 178 comprises tab 180 and hole 182 extending circumferentially through tab 180. In an exemplary embodiment, tab 180 extends from circumferential end 192 in circumferential direction CD1 and/or radial direction RD1. Female connector 178 of one of sections 150A and 150B is arranged to engage male connector 162 of the other of sections 150A and 150B to lock section 150B to section 150A. Specifically, tab 164 and/or projection 166 of section 150A is arranged to engage hole 182 of section 150B and tab 164 and/or projection 166 of section 150B is arranged to engage hole 182 of section 150A to lock section 150A to section 150B. In an exemplary embodiment, female connector 178 further comprises radially inward extending recess 184. Recess 184 is axially aligned with hole 182. In an exemplary embodiment, the axial width of recess 184 is equal to the axial width of hole 182. In an exemplary embodiment, the axial width of hole 182 is greater than the axial width of tab 164.

Female connector 178 may further comprise protrusion 186. Protrusion 186 extends from circumferential end 192 in circumferential direction CD1 and is operatively arranged to engage radial space 170 to help align section 150A with section 150B during the connection process. In an exemplary embodiment, protrusion 186 is axially aligned with hole 182. In an exemplary embodiment, protrusion 186 is arranged axially between and spaced apart from end 152 and end 154. In an exemplary embodiment, protrusion 186 decreases in width in circumferential direction CD1. Tab 164 is arranged to extend circumferentially through hole 182. Projection 166 engages tab 180 to lock section 150A to section 150B. Recess 184 provides spacing for tab 164 to displace or pivot radially inward during engagement with tab 180 and/or hole 182, for example due to tapered surface 168. Once projection 166 clears hole 182, tab 164 snaps back radially outward.

To assemble fluid connection assembly 10, tube 20 is slid onto tube 30 such that end 22 is arranged axially between barb 40 and end 32. Retainer 150 is arranged radially around tube 20 and tube 30 with sections 150A and 150B unlocked and/or separated. Section 150A is displaced radially toward section 150B until tabs 164 engage tabs 180. Tabs 164 displace radially inward as tapered surfaces 168 slide along tabs 180 and/or holes 182. Once projections 166 clear holes 182, tabs 164 snap back to their original position such that projections 166 engage tabs 180, thereby locking section 150A to section 150B. Retainer 150 squeezes tube 20 around tube 30. Specifically, ribs 160A-16B provides acute radial forces on tube 20 to facilitate a sealing connection between tube 20 and tube 30.

Figure 8A:
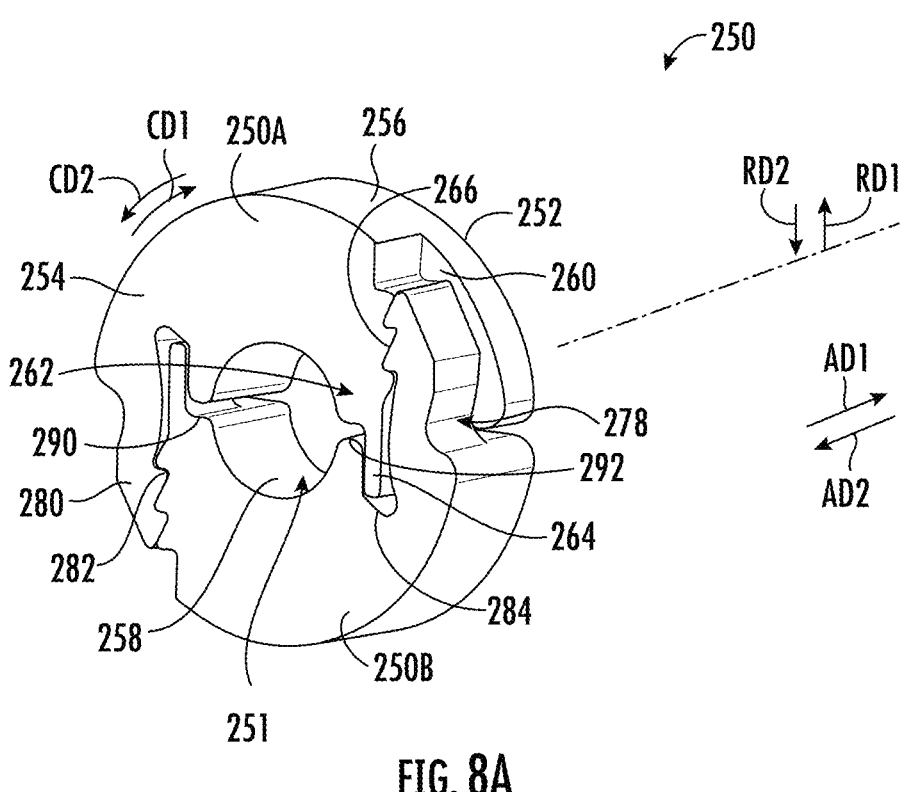
FIG. 8A is a front perspective view of the third embodiment of the retainer shown in FIG. 1.
Figure 8B:
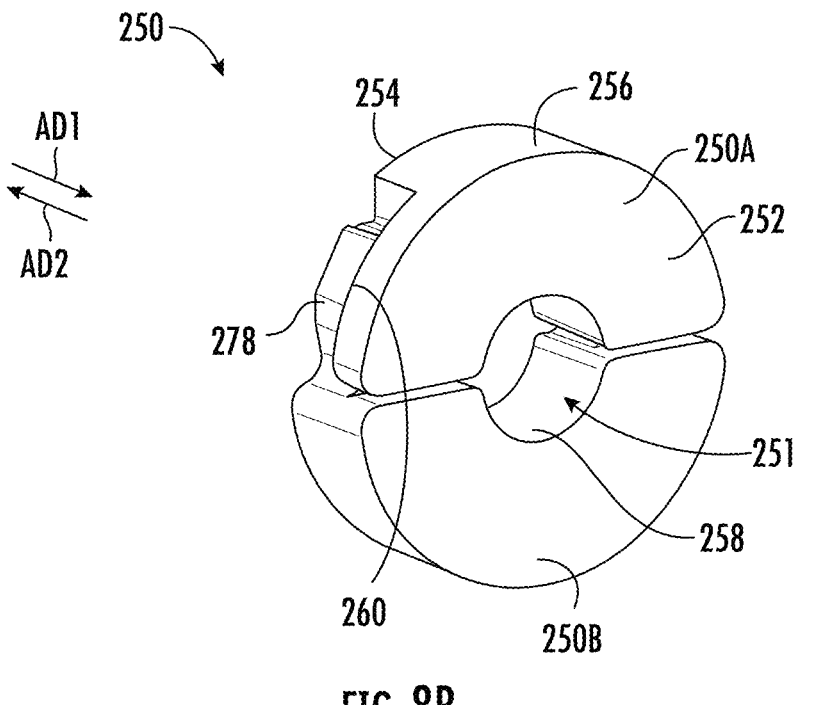
FIG. 8B is a rear perspective view of the retainer shown in FIG. 8A.

FIG. 8A is a front perspective view of retainer 250. FIG. 8B is a rear perspective view of retainer 250. Retainer 250 comprises end 252, end 254, radially outward facing surface 256, radially inward facing surface 258, and through-bore 251. Through-bore 251 extends through retainer 250 from end 252 to end 254. Retainer 250 is operatively arranged to secure tube 20 to tube 30. In an exemplary embodiment, radially inward facing surface 258 comprises at least one rib or flange extending radially inward therefrom (not shown).

Retainer 250 comprises section 250A and section 250B operatively arranged to be secured together to squeeze tube 20 around tube 30, forming a sealing connection therebetween. Section 250A is completely removable from section 250B. Section 250A is substantially identical to section 250B. Section 250A, 250B comprises male connector 262 and female connector 278. Section 250A, 250B comprises circumferential end 290 and circumferential end 292. In an exemplary embodiment, circumferential end 290 extends radially outward from radially inward facing surface 258. In an exemplary embodiment, circumferential end 290 extends axially between end 252 and end 254. In an exemplary embodiment, circumferential end 292 extends radially outward from radially inward facing surface 258. In an exemplary embodiment, circumferential end 292 extends axially between end 252 and end 254.

Male connector 262 comprises tab or arm 264. Tab 264 extends from circumferential end 290 in circumferential direction CD1. Tab 264 is arranged to engage groove 284, as will be described in greater detail below. Male connector 262 further comprises recess 260 arranged proximate circumferential end 290. Recess 260 extends from end 254 in axial direction AD1 and forms plurality of teeth 266. In an exemplary embodiment, teeth 266 extend in a radially outward direction. In an exemplary embodiment, teeth 266 extend in a radially inward direction. Teeth 266 are operatively arranged to engage teeth 282 to lock section 250A with section 250B, as will be described in greater detail below. Recess 260 further extends radially inward from radially outward facing surface 256. Recess 260 extends from end 254 only partially to end 252 which allows end 252 to protect the engagement of teeth 266 and teeth 282. For example, the disc shaped end 252 helps prevent the ingress of debris into retainer 250 and/or unwanted disengagement of teeth 282 from teeth 266.

Female connector 278 comprises tab or arm 280. Tab 280 extends from circumferential end 292 in circumferential direction CD2. Tab 280 comprises plurality of teeth 282. In an exemplary embodiment, teeth 282 extend radially inward to engage teeth 266. In an exemplary embodiment, teeth 282 extend radially outward to engage teeth 266. Tab 282 is arranged to engage recess 266. In an exemplary embodiment, tab 282 is arranged radially inward and spaced apart from radially outward facing surface 256. In an exemplary embodiment, female connector 278 further comprises groove or radial space 284 arranged radially between radially inward facing surface 258 and tab 280. Tab 264 is arranged to engage radial space 284 to help align section 250A with section 250B during the connection process.

To assemble fluid connection assembly 10, tube 20 is slid onto tube 30 such that end 22 is arranged axially between barb 40 and end 32. Retainer 250 is arranged radially around tube 20 and tube 30 with sections 250A and 250B unlocked and/or separated. Section 250A is displaced radially toward section 250B until tabs 280 engage recesses 260, and specifically, until teeth 282 engage teeth 266. Tabs 280 are capable of displacing and/or pivoting radially outward as teeth 282 slide along teeth 266. Since there are a plurality of teeth 282 and 266, retainer 250 is adjustable to any desired diameter of radially inward facing surface 258. Thus, the ratchet connection of teeth 282 with teeth 266 allow retainer 250 to be used with multiple diameter tubes 20 and 30. Section 250A is displaced radially toward section 250B until a desired diameter of radially inward facing surface 258 is reached, at which point teeth 282 and teeth 266 engage thereby locking section 250A to section 250B. Retainer 250 squeezes tube 20 around tube 30 and facilitates a sealing connection between tube 20 and tube 30.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connection assembly
20 Tube
21 Through-bore
22 End
24 End
26 Radially outward facing surface
28 Bulge 30 Tube or connector body
31 Through-bore
32 End
34 End
36 Radially outward facing surface
38 Barb
40 Radially outward facing surface
42 Surface
50 Retainer
50A Section
50B Section
51 Through-bore
52 End
54 End
56 Radially outward facing surface
58 Radially inward facing surface
60 Rib
62 Male connector
64 Recess
66 Projection
68 Tapered surface
70 Surface
72 Surface
74 Tapered surface
76 Tapered surface
78 Female connector
80 Tab
82 Hole
84 Tapered surface
86 Tapered surface
90 Circumferential end
92 Circumferential end
150 Retainer
150A Section
150B Section
151 Through-bore
152 End
154 End
156 Radially outward facing surface
158 Radially inward facing surface
160A Rib or flange
160B Rib or flange
162 Male connector
164 Tab
166 Projection
168 Tapered surface
170 Groove or radial space
172 Protrusion
178 Female connector
180 Tab
182 Hole
184 Recess
186 Protrusion
190 Circumferential end
192 Circumferential end
250 Retainer
250A Section
250B Section
251 Through-bore
252 End
254 End
256 Radially outward facing surface
258 Radially inward facing surface
260 Recess
262 Male connector
264 Arm
266 Teeth 278 Female connector
280 Arm
282 Teeth
284 Radial space
290 Circumferential end
292 Circumferential end
AD1 Axial direction
AD2 Axial direction
CD1 Circumferential direction
CD2 Circumferential direction
RD1 Radial direction
RD2 Radial direction

What is claimed is:

1. A retainer for a fluid connection assembly, comprising:
a first section including a first male connector and a first female connector;
a second section completely removable from the first section, the second section comprising a second male connector and a second female connector;
a first end;
a second end;
a radially inward facing surface including a radially inward extending rib; and
a radially outward facing surface;
wherein:
the first male connector is arranged to engage the second female connector and the second male connector is arranged to engage the first female connector to lock the first section to the second section;
at least one of the first male connector and the second male connector comprises a first recess extending radially inward from the radially outward facing surface and a first projection extending radially outward from the first recess; and
the first recess increases in width in a first circumferential direction.

2. The retainer as recited in claim 1, wherein the first recess is arranged axially between and spaced apart from the first end and the second end.

3. The retainer as recited in claim 2, wherein the first recess forms a first axial surface and a second axial surface.

4. The retainer as recited in claim 3, wherein the first projection is arranged axially between and spaced apart from the first axial surface and the second axial surface.

5. The retainer as recited in claim 1, wherein the first projection comprises a tapered surface that extends radially outward in a second circumferential direction, opposite the first circumferential direction.

6. The retainer as recited in claim 1, wherein the at least one rib comprises:
a first axial surface extending radially inward from the radially inward facing surface;
a second axial surface extending radially inward from the radially inward facing surface; and
a convex surface connecting the first axial surface with the second axis surface.

7. The retainer as recited in claim 1, wherein at least one of the first female connector and the second female connector comprises:
a circumferential end; and
a tab extending in a circumferential direction from the circumferential end, the tab including a through-hole.

8. The retainer as recited in claim 7, wherein an axial distance between the first end and the second end is greater than the width of the tab.

9. The retainer as recited in claim 1, wherein at least one of the first male connector and the second male connector comprises:
a first circumferential end; and
a first tab extending in a first circumferential direction from the first circumferential end, wherein the first tab includes a second projection, the second projection extending radially outward.

10. The retainer as recited in claim 9, wherein an axial distance between the first end and the second end is greater than the width of the first tab.

11. The retainer as recited in claim 9, wherein the at least one of the first male connector and the second male connector further comprises a first protrusion extending in the first circumferential direction from the first circumferential end, wherein a radial space is formed between the first tab and the first protrusion.

12. The retainer as recited in claim 11, wherein at least one of the first female connector and the second female connector comprises a second protrusion operatively arranged to engage the radial space.

13. The retainer as recited in claim 9, wherein at least one of the first female connector and the second female connector comprises:
a second circumferential end; and
a second tab extending radially outward from the second circumferential end, wherein the second tab includes a through-hole.

14. The retainer as recited in claim 13, wherein the at least one of the first female connector and the second female connector further comprises a second recess, the second recess extending radially inward and axially aligned with the through-hole.

15. The retainer as recited in claim 1, wherein the at least one rib is arranged axially between and spaced apart from the first end and the second end.

16. The retainer as recited in claim 1, wherein the at least one rib comprises:
a first rib aligned with the first end; and
a second rib aligned with the second end, the second rib axially spaced apart from the first rib.

17. The retainer as recited in claim 1, wherein at least one of the first male connector and the second male connector comprises:
a second recess extending from the second end partially toward the first end in an axial direction, the second recess forming a first plurality of teeth;
a first circumferential end; and
a protrusion extending from the first circumferential end in a first circumferential direction.

18. The retainer as recited in claim 17, wherein at least one of the first female connector and the second female connector comprises:
a second circumferential end;
a tab extending from the second circumferential end in a second circumferential direction, opposite the first circumferential direction, the tab forming a second plurality of teeth engageable with the first plurality of teeth; and
a radial space arranged between the tab and the radially inward facing surface, wherein the protrusion is operatively arranged to engage the radial space.

19. A retainer for a fluid connection assembly, comprising:
a first section including a first male connector and a first female connector;

a second section completely removable from the first section, the second section comprising a second male connector and a second female connector;

a first end;

a second end;

a radially inward facing surface including a radially inward extending rib; and a radially outward facing surface;

wherein:

the first male connector is arranged to engage the second female connector and the second male connector is arranged to engage the first female connector to lock the first section to the second section; and at least one of the first male connector and the second male connector comprises a first circumferential end, and a first tab extending in a first circumferential direction from the first circumferential end, wherein the first tab includes a radially outward extending projection.

20. A retainer for a fluid connection assembly, comprising:

a first section including a first male connector and a first female connector;

a second section completely removable from the first section, the second section comprising a second male connector and a second female connector;

a first end;

a second end;

a radially inward facing surface including a radially inward extending rib; and a radially outward facing surface;

wherein:

the first male connector is arranged to engage the second female connector and the second male connector is arranged to engage the first female connector to lock the first section to the second section; and at least one of the first female connector and the second female connector comprises a circumferential end and a tab extending in a circumferential direction from the circumferential end, the tab including a radially extending through-hole.

\*    \*    \*    \*    \*